Figure 1:
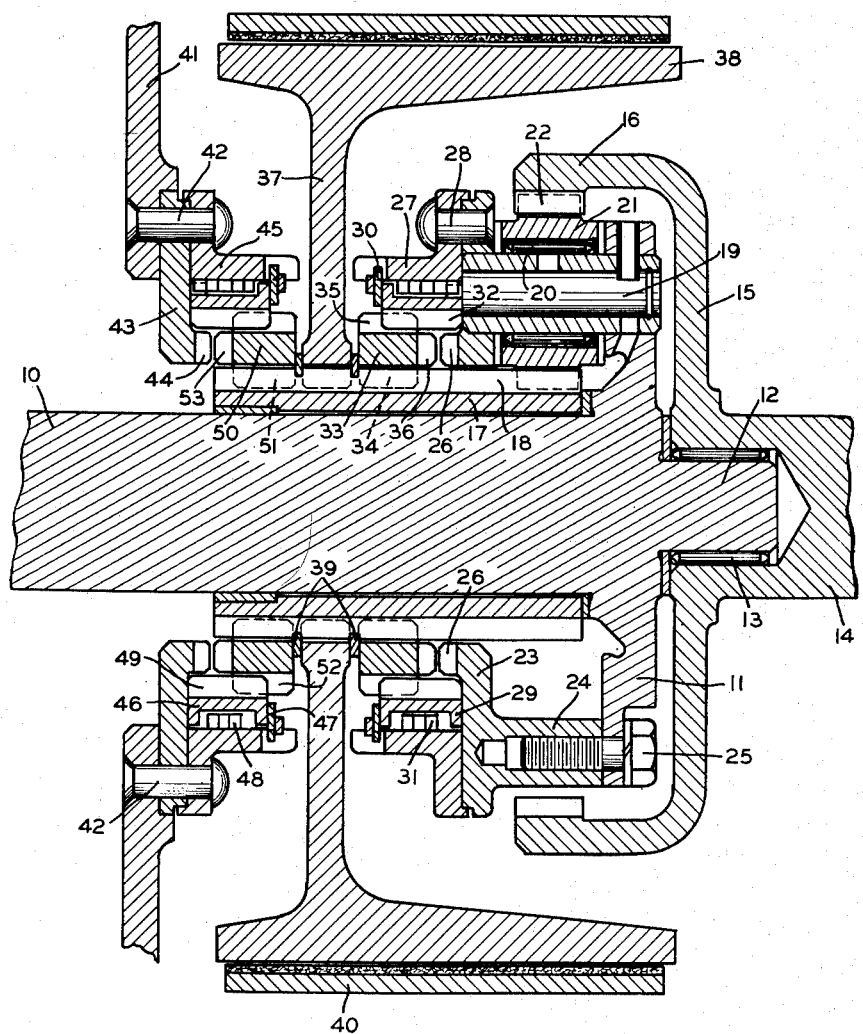

March 3, 1953  R. LAPSLEY  2,630,025

TRANSMISSION

Filed May 10, 1951

INVENTOR.
ROBERT LAPSLEY
BY
ATTYS.

Patented Mar. 3, 1953

2,630,025

UNITED STATES PATENT OFFICE 2,630,025

TRANSMISSION

Robert Lapsley, Buchanan, Mich., assignor to Clark Equipment Company, Buchanan, Mich., a corporation of Michigan Application May 10, 1951, Serial No. 225,644

8 Claims. (Cl. 74—781)

My invention relates generally to transmissions, and, more specifically, is directed to a combined manually and automatically operable overdrive unit.

The primary object of my present invention is to provide a two speed drive which may be selectively changed under full driving power.

Another object is to provide a selective two speed drive, without free coasting being possible.

It is a further object of my present invention to provide an overdrive unit arranged between a drive shaft and a driven shaft whereby when the drive shaft tends to overrun the driven shaft direct drive is effected between the shafts, and when desired, overdrive between the shafts may be selectively effected irrespective of the relative rotations of the shafts, which selection may be effected against full drive power.

In the accomplishment of the above objects, I provide a drive shaft having a planet carrier at one end thereof and a driven shaft having an internal ring gear at the end thereof adjacent the planet carrier. An externally splined sleeve member is mounted concentrically about the drive shaft and suitable planet pinions which are carried by the planet carrier are disposed in meshing engagement with the sleeve member and the ring gear. Suitable means is provided between the planet carrier and sleeve member for clutching them together when the drive shaft tends to overrun the driven shaft. Such means in the specific form of my invention comprises first clutch means associated with the planet carrier and second clutch means mounted on the sleeve member for axial movement toward and away from the first clutch means. External helical threads are formed on the second clutch means and a spring carrier having internal helical threads is disposed in engagement therewith. A coil spring friction clutch is mounted on the spring carrier and is adapted to normally lightly engage a clutch drum suitably secured to the planet carrier. The coil spring friction clutch is operable upon overrunning of the drive shaft relative to the driven shaft to clutch the spring carrier to the clutch drum whereby the second clutch means is caused to be threaded into engagement with the first clutch means. When the sleeve member is clutched to the planet carrier, direct drive is effected between the drive and driven shafts. In order to effect overdrive a brake drum having an inwardly directed flange is mounted on the sleeve member and a brake band is disposed about the brake drum. When the brake band is applied to the drum, the sleeve member is held against rotation and the second clutch means is disengaged from the first clutch means. The sleeve member acts as a reaction point for the planet pinions and overdrive is thus effected between the drive and driven shafts.

It is another object of my present invention to provide an overdrive unit of the character described whereby when the driven shaft tends to overrun the drive shaft overdrive is automatically effected between the shafts.

In order to accomplish the above object, first brake means is associated with the overdrive housing and second brake means is mounted on the sleeve member for axial movement toward and away from the first brake means. External helical threads are formed on the second brake means and a spring carrier having internal helical threads is disposed in engagement therewith. A coil spring friction brake is mounted on the spring carrier and is adapted to normally lightly engage a brake drum secured to the housing. The coil spring friction brake is operable upon overrunning of the driven shaft relative to the drive shaft to brake the spring carrier to the brake drum whereby the second brake means is caused to be threaded into engagement with the first brake means. With the first and second brake means engaged, the sleeve member is held against rotation and overdrive is effected between the drive and driven shafts. Upon overrunning of the drive shaft relative to the driven shaft, the first and second brake means are disengaged.

The above described transmission of my present invention may, for example, be embodied in a tractor or other like vehicle. When the vehicle is normally operating, the drive shaft of the overdrive unit tends to overrun the driven shaft and direct drive is effected between the shafts in the manner noted above. When overdrive or high ratio drive is desired the brake band is applied to the brake drum. When, for example, a sudden load is imposed on the vehicle, the brake band may be released and direct drive is again effected between the shafts. When the brake band is released from the drum and the vehicle begins coasting, the driven shaft tends to overrun the drive shaft, and as described above, overdrive is automatically effected between the shafts, preventing undesirable free wheeling of the vehicle.

Now, in order to acquaint those skilled in the art with the manner of constructing and using the device of my present invention, I shall describe in connection with the accompanying drawing, a preferred embodiment of my invention.

In the drawing:

Figure 1 is a vertical sectional view of the overdrive unit of my present invention.

Referring now to the drawing, there is shown at 10 an input or drive shaft which is adapted to be suitably driven at the forward or left end thereof as viewed in Figure 1. The shaft 10 at the rear or right end thereof is formed with a radially extending, circumferentially continuous, flange portion or planet carrier 11 and an axially, rearwardly extending, reduced nose portion 12. A plurality of needle bearings 13 are disposed about the outer periphery of the reduced portion 12 and journaled on the needle bearings 13 is the forward end of a rearwardly extending output or driven shaft 14. The forward end of the output shaft 14 is formed with a radially extending, circumferentially continuous, flange portion 15 which at its outer periphery has formed integrally therewith an axially, forwardly extending, annular ring gear portion 16 which overlies the aforementioned flange 11 of the input shaft 10. Internal gear teeth 22 are formed in the annular ring gear portion 16 for a purpose to be hereinafter described.

A sleeve member 17 is mounted concentrically about the input shaft 10 and is formed with longitudinally extending external splines 18. The splined sleeve member 17 acts as a sun gear in the planetary gear mechanism to be described. A plurality of circumferentially spaced pin members 19 are fixed at their one ends in the radially extending flange portion 11 of the input shaft 10. Needle bearings 20 are disposed about the outer periphery of the pin members 19 and journaled on the needle bearings 20 are planet pinions 21. The planet pinions 21 have meshing engagement with the internal gear teeth 22 formed in the ring gear portion 16. The planet pinions 21 also have meshing engagement with the external splines 18 formed in the sleeve member 17.

A frame member 23 is provided which is formed with circumferentially spaced axially rearwardly extending projecting portions 24. The axially extending portions 24 are suitably secured, as by bolts 25, to the radial flange portion 11 of input shaft 10 intermediate of pin members 19. The frame member 23 and flange portion 11 of shaft 10 form a planet carrier. The forward ends of the pin members 19 are suitably fixed in the frame member 23. The frame member 23 adjacent the sleeve member 17 is formed with radially extending circumferentially spaced clutch or ratchet teeth 26. The flange of a cylindrical clutch drum 27 is suitably secured to the frame member 23 by means of rivets 28. An annular spring carrier 29 is mounted concentrically within the clutch drum 27 and at one side abuts against the frame member 23 and at the other side is held against axial movement by means of a bearing washer 30 seated in the clutch drum 27. The spring carrier 29 carries on its outer periphery a coil spring friction clutch 31 which at one end is fixed to the spring carrier 29 and at its other end is free. The outer periphery of the coil spring friction clutch 31 normally lightly frictionally engages the inner periphery of the clutch drum 27.

The inner periphery of the spring carrier 29 is formed with helical threads 32. An annular clutch element 33 is formed with internal splines 34 which are disposed in cooperating engagement with the external splines 18 of the sleeve member 17. The clutch element 33 is also formed with external helical threads 35 which are disposed in cooperating engagement with the internal helical threads 32 of the spring carrier 29. The clutch element 33 is formed with radially extending circumferentially spaced clutch or ratchet teeth 36 which are adapted to be disposed selectively in engagement with the clutch teeth 26 of frame member 23.

Splined to the outer periphery of the sleeve member 17 is the radial flange 37 of a brake member 38. The flange 37 is maintained in position on the sleeve member 17 by means of a pair of retainer rings 39. A suitable brake band 40 is disposed about the outer periphery of the brake drum 38 and the brake band 40 is adapted to be selectively disposed in engagement with the brake drum 38 by means of any suitable actuating mechanism for a purpose to be described hereinafter.

Mounted on a stationary housing member 41, as by rivets 42, is a ring member 43 and the radial flange of a cylindrical brake drum 45. The member 43 is formed with radially extending circumferentially spaced clutch or ratchet teeth 44. Disposed concentrically within the brake drum 45 is an annular spring carrier 46 which at its one side abuts against the ring member 43 and at its other side is maintained axially in position by means of a bearing washer 47 seated in the brake drum 45. Disposed about the outer periphery of the spring carrier 46 is a coil spring friction brake 48 which at its one end is fixed to the spring carrier 46 and at its other end is free. The coil spring friction brake 48 is normally adapted to lightly engage the inner periphery of the brake drum 45. The spring carrier 46 is formed at its inner periphery with internal helical threads 49.

A brake element 50 is formed with internal splines 51 which are disposed in engagement with the external splines 18 of the sleeve member 17. The brake element 50 is also formed with external helical threads 52 which are disposed in engagement with the internal helical threads 49 of the spring carrier 46. The brake element 50 is still further provided with radially extending circumferentially spaced clutch or ratchet teeth 53 which are adapted to be disposed selectively in meshing engagement with the clutch or ratchet teeth 44 formed on the ring member 43.

Upon initial rotation of the input shaft 10 relative to the output shaft 14, the coil spring friction clutch 31, which normally lightly frictionally engages the inner periphery of the clutch drum 27, is twisted in a direction causing radial expansion and thereby is forced tightly into engagement with the clutch drum 27 causing the spring carrier 29 to tend to rotate conjointly with the clutch drum 27. This initial movement of the spring carrier 29 conjointly with the clutch drum 27 causes the clutch element 33 through the action of the cooperating helical threads 32 and 35, to be threaded to the right from the position shown in Figure 1. When the clutch element 33 has been threaded to its extreme right position the ratchet clutch teeth 36 are disposed in engagement with the ratchet clutch teeth 26 thereby positively clutching the sleeve member 17 to the input shaft 10 for conjoint rotation therewith. When the sleeve member 17 has been clutched to the frame member 23, the planet pinions 21 are held against rotation relative to the pin members 19, and the output or driven shaft 14 is driven at direct drive or a one-to-one ratio.

When it is desired to drive the output or driven shaft 14 at a lower ratio or higher speed ratio than the input or drive shaft 10 the brake band 40 is selectively disposed in engagement with the brake drum 38 thereby holding the latter against rotation. When the brake drum 38 is held against rotation the sleeve member 17 is likewise held against rotation. Simultaneously, frictional engagement of the coil 31 with the clutch drum 27 is decreased and the clutch element 33 is caused to be threaded to the left to the position shown in Fig. 1, thereby effecting disengagement of the clutch teeth 36 and 26. The planet pinions 21 are then free to rotate about the pin members 19, with the sleeve member 17 acting as a reaction point. Low ratio drive or overdrive is thus effected between the input shaft 10 and output shaft 14 through the planet pinions 21.

If the brake band 40 is released from engagement with the brake drum 38 it will be seen that the sleeve member 17 will again be free to rotate. Simultaneously, upon the release of the brake band 40 the coil spring friction clutch 31 will again tightly frictionally engage the clutch drum 27 causing the spring carrier 29 to tend to rotate conjointly with the clutch drum 27. This will, as described above, cause the clutch element 33 through the action of the cooperating helical threads 32 and 35, to be threaded to the right until the clutch teeth 36 are disposed in engagement with clutch teeth 26 for providing direct drive or a one-to-one ratio between the input shaft 10 and the output shaft 14.

If the output shaft 14 should begin to overrun the input shaft 10, the engagement of the coil spring friction clutch 31 with the clutch drum 27 decreases and the spring carrier 29 tends to rotate with the sleeve member 17. This causes the clutch element 33 to be threaded to the position shown in Figure 1 thereby effecting disengagement of the clutch teeth 36 and 26. Simultaneously, upon overrunning of the output shaft 14 with respect to the input shaft 10, the coil spring friction brake 48 begins to tightly engage the inner periphery of the brake drum 45 which tends to brake the spring carrier 46. Braking of the spring carrier 46 causes the brake element 50 to be threaded axially to the left, through the action of the cooperating helical threads 49 and 52. When the brake element 50 has been threaded to its extreme left position, the ratchet teeth 53 are disposed in engagement with the ratchet teeth 44 which positively holds the sleeve member 17 against rotation. With the sleeve member 17 held against rotation a reaction point is again provided for the planet pinions 21 and overdrive is effected between the input shaft 10 and the output shaft 14.

When the input shaft 10 begins to initially overrun the output shaft 14, the brake element 50 is threaded to the right to the position shown in Figure 1, and the clutch element 33 is simultaneously threaded to the right from the position shown in Figure 1 until the clutch teeth 36 are disposed in engagement with the clutch teeth 26. Overdrive is interrupted and direct drive is again effected.

From the foregoing description it will be seen that I have provided an overdrive unit arranged between an input or drive shaft and an output or driven shaft whereby when the input shaft tends to overrun the output shaft, direct drive is effected between the input and output shafts, and when the output shaft tends to overrun the input shaft, high ratio or overdrive is effected automatically between the input and output shafts. It will further be noted that overdrive may be manually selected even though the input shaft is overrunning the output shaft, by the application of the brake band 40 to the brake drum 38.

It is to be further noted that the brake drum flange 37 is mounted to the sleeve member 17 intermediate of the clutch element 33 and brake element 50 and that the brake drum 38 overlies the planet carrier and ring gear 22 thus providing for a compact overdrive unit.

It will be further understood that the two speed ratios may be selected under the full driving power by the application of the brake band to the brake drum. Gradually clamping the band will smoothly slow the brake drum to a stop effecting a gradual transition from the direct drive ratio to the over drive ratio, while gradually releasing the brake band will effect a gradual transition from the over drive ratio back to the direct drive ratio.

While I have shown and described what I believe to be a preferred embodiment of my invention, it will be understood that various modifications and rearrangements may be made therein without departing from the spirit and scope of my present invention.

I claim:

1. The combination of, a housing, a drive shaft, a planet carrier at one end of said drive shaft, a driven shaft, an internal ring gear on the end of said driven shaft adjacent said planet carrier, an externally splined sleeve member mounted concentrically about said drive shaft, planet pinions carried by said planet carrier and having meshing engagement with said ring gear and said sleeve member, positive clutch means associated with said planet carrier and said sleeve member, first brake means associated with said housing and said sleeve member, second brake means associated with said sleeve member, first means for effecting engagement of said clutch means when said drive shaft tends to overrun said driven shaft whereby direct drive is effected between said drive and driven shafts, said first means effecting disengagement of said clutch means when said driven shaft tends to overrun said drive shaft or said second brake means is actuated, second means for effecting engagement of said first brake means when said driven shaft tends to overrun said drive shaft for providing overdrive between said drive and driven shafts, said second means effecting disengagement of said first brake means when said drive shaft tends to overrun said driven shaft, and said brake means when gradually actuated being operable to effect a gradual transition from direct drive to overdrive under full driving power and when gradually released being operable to effect a gradual transition from overdrive to direct drive under full driving power.

2. The combination of, a housing, a drive shaft, a planet carrier on the end of said drive shaft, a driven shaft, an internal ring gear on the end of said driven shaft adjacent said planet carrier, an externally splined sleeve member mounted concentrically about said drive shaft, planet pinions carried by said planet carrier and having meshing engagement with said ring gear and said sleeve member, first clutch means associated with said planet carrier, second clutch means carried by said sleeve member and movable axially into and out of engagement with said first clutch means, first brake means associated with said sleeve member for effecting braking of the latter, first means between said planet carrier and said second clutch means operable to effect engagement of said first and second clutch means when said drive shaft tends to overrun said driven shaft whereby direct drive is effected between said drive and driven shafts, said first means being operable to effect disengagement of said first and second clutch means when said driven shaft tends to overrun said drive shaft or when said first brake means is actuated, second brake means associated with said housing, third brake means carried by said sleeve member and movable axially into and out of engagement with said second brake means, second means between said housing and said third brake means operable to effect engagement of said second and third brake means when said driven shaft tends to overrun said drive shaft whereby overdrive is effected between said drive and driven shafts, said second means being operable to effect disengagement of said second and third brake means when said drive shaft tends to overrun said driven shaft, and said first brake means when gradually actuated being operable to effect a gradual transition from direct drive to overdrive under full driving power and when gradually released being operable to effect a gradual transition from overdrive to direct drive under full driving power.

3. The combination of, a drive shaft, a planet carrier on the end of said drive shaft, a driven shaft, an internal ring gear on the end of said driven shaft adjacent said planet carrier, an externally splined sleeve member mounted concentrically about said drive shaft, planet pinions carried by said planet carrier and having meshing engagement with said ring gear and said sleeve member, first clutch means associated with said planet carrier, second clutch means carried by said sleeve member for movement axially toward and away from said first clutch means, external helical threads formed on said second clutch means, an axially fixed annular spring carrier having internal helical threads cooperating with said external helical threads on said second clutch means, a coil spring friction clutch carried on the outer periphery of said spring carrier, and said coil spring friction clutch being operable upon overrunning of said drive shaft relative to said driven shaft to clutch said spring carrier to said planet carrier whereby said second clutch means is caused to be threaded into engagement with said first clutch means for effecting a direct drive between said drive and driven shafts.

4. The combination of, a housing, a drive shaft, a planet carrier on the end of said drive shaft, a driven shaft, an internal ring gear on the end of said driven shaft adjacent said planet carrier, an externally splined sleeve member mounted concentrically about said drive shaft, planet pinions carried by said planet carrier and having meshing engagement with said ring gear and said sleeve member, first brake means associated with said sleeve member, first clutch means associated with said planet carrier, second clutch means mounted on said sleeve member for axial movement toward and away from said first clutch means, external helical threads formed on said second clutch means, an axially fixed annular spring carrier having internal helical threads cooperating with said external helical threads on said second clutch means, a coil spring friction clutch carried on the outer periphery of said spring carrier, said coil spring friction clutch being operable upon overrunning of said drive shaft relative to said driven shaft to clutch said spring carrier to said planet carrier whereby said second clutch means is caused to be threaded into clutching engagement with said first clutch means for effecting direct drive between said drive and driven shafts, second brake means formed on said housing, third brake means mounted on said sleeve member for axial movement toward and away from said second brake means, external helical threads formed on said third brake means, an axially fixed annular spring carrier having internal helical threads cooperating with said external helical threads on said third brake means, a coil spring friction brake carried on the outer periphery of the said spring carrier associated with said third brake means, and said coil spring friction brake being operable upon overrunning of said driven shaft relative to said drive shaft to brake said spring carrier to said housing whereby said third brake means is caused to be threaded into engagement with said second brake means for effecting overdrive between said drive and driven shafts, and said first brake means when gradually actuated being operable to effect a gradual transition from direct drive to overdrive under full driving power and when gradually released being operable to effect a gradual transition from overdrive to direct drive under full driving power.

5. The combination of, a drive shaft, a planet carrier on the end of said drive shaft, a driven shaft, an internal ring gear on the end of said driven shaft adjacent said planet carrier, an externally splined sleeve member mounted concentrically about said drive shaft, planet, pinions carried by said planet carrier and having meshing engagement with said ring gear and said sleeve member, a first set of ratchet teeth formed on said planet carrier, a clutch element having internal splines mounted on the external splines of said sleeve member for axial movement toward and away from said first set of ratchet teeth, said clutch element having a second set of ratchet teeth adapted to cooperate with said first set of ratchet teeth of said planet carrier, external helical threads formed on said clutch element, an axially fixed annular spring carrier having internal helical threads cooperating with said external helical threads on said clutch element, a coil spring friction clutch carried on the outer periphery of said spring carrier, an annular clutch drum secured to said planet carrier, and said coil spring friction clutch being operable upon overrunning of said drive shaft relative to said driven shaft to clutch said spring carrier to said clutch drum whereby said second set of ratchet teeth are caused to be threaded into engagement with said first set of ratchet teeth for effecting direct drive between said drive and driven shafts.

6. The combination of, a housing, a drive shaft, a planet carrier on the end of said drive shaft, a driven shaft, an internal ring gear on the end of said driven shaft adjacent said planet carrier, an externally splined sleeve member mounted concentrically about said drive shaft, planet pinions carried by said planet carrier and having meshing engagement with said ring gear and said sleeve member, a first set of ratchet teeth on said planet carrier, a clutch element having internal splines disposed in engagement with the external splines of said sleeve member and adapted for axial movement toward and away from said planet carrier, said clutch element having a second set of ratchet teeth adapted to cooperate with said first set of ratchet teeth on said planet carrier, external helical threads formed on said clutch element, an axially fixed annular spring carrier having internal helical threads cooperating with said external helical threads on said clutch element, a coil spring friction clutch carried on the outer periphery of said spring carrier, an annular clutch drum secured to said planet carrier, said coil spring friction clutch being operable upon overrunning of said drive shaft relative to said driven shaft to clutch said spring carrier to said clutch drum whereby said second set of ratchet teeth are caused to be threaded into engagement with said first set of ratchet teeth for effecting direct drive between said drive and driven shafts, a third set of ratchet teeth on said housing, a brake element having internal splines disposed in engagement with the external splines of said sleeve member and adapted for axial movement toward and away from said housing, said brake element having a fourth set of ratchet teeth adapted to be disposed in engagement with said third set of ratchet teeth, external helical threads formed on said brake element, an axially fixed annular spring carrier having internal helical threads cooperating with said external helical threads on said brake element, a coil spring friction brake carried on the outer periphery of said last named spring carrier, a brake drum secured to said housing, said coil spring friction brake being operable upon over-running of said driven shaft relative to said drive shaft to brake said spring carrier to said brake drum whereby said fourth set of ratchet teeth are caused to be threaded into engagement with said third set of ratchet teeth, said coil spring friction brake being operable upon over-running of said drive shaft relative to said driven shaft to effect disengagement of said third and fourth sets of ratchet teeth, a brake drum having a radially inwardly directed flange secured to said sleeve member intermediate said clutch and brake elements, a brake band encircling said drum for selectively braking the latter, and said coil spring friction clutch being operable when said driven shaft tends to over-run said drive shaft or upon braking of said last named brake drum to effect disengagement of said first and second sets of ratchet teeth whereby overdrive is effected between said drive and driven shafts, and said brake band when gradually applied to said brake drum being operable to effect a gradual transition from direct drive to overdrive under full driving power and when gradually released from engagement with said brake drum being operable to effect a gradual transition from overdrive to direct drive under full driving power.

7. The combination of a housing, a drive shaft, a planet carrier at one end of said drive shaft, a driven shaft, an internal ring gear on the end of said driven shaft adjacent said planet carrier, a sun gear mounted concentrically about said drive shaft, planet pinions carried by said planet carrier and having meshing engagement with said ring gear and said sun gear, clutch means associated with said planet carrier and said sun gear, first brake means associated with said housing and said sun gear, second brake means associated with said sun gear, first means for effecting engagement of said clutch means when said drive shaft tends to overrun said driven shaft whereby direct drive is effected between said drive and driven shafts, said first means effecting disengagement of said clutch means when said driven shaft tends to overrun said drive shaft or said second brake means is actuated, second means for effecting engagement of said first brake means when said driven shaft tends to overrun said drive shaft for providing overdrive between said drive and driven shafts, said second means effecting disengagement of said first brake means when said drive shaft tends to overrun said driven shaft, and said second brake means when gradually actuated being operable to effect a gradual transition from direct drive to overdrive under full driving power and when gradually released being operable to effect a gradual transition from overdrive to direct drive under full driving power.

8. The combination of a housing, a drive shaft, a planet carrier on the end of said drive shaft, a driven shaft, an internal ring gear on the end of said driven shaft adjacent said planet carrier, an externally splined sleeve member mounted concentrically about said drive shaft, planet pinions carried by said planet carrier and having meshing engagement with said ring gear and said sleeve member, first brake means associated with said housing, second brake means carried by said sleeve member for movement axially toward and away from said first brake means, external helical threads formed on said second brake means, an axially fixed annular spring carrier having internal helical threads cooperating with said external helical threads on said second brake means, a coil spring friction brake carried on the outer periphery of said spring carrier, and said coil spring friction brake being operable upon overrunning of said driven shaft relative to said drive shaft to brake said spring carrier to said housing whereby said second brake means is caused to be threaded into engagement with said first brake means for effecting overdrive between said drive and driven shafts.

ROBERT LAPSLEY.

REFERENCES CITED

The following references are of record in the file of this patent:

UNITED STATES PATENTS

| Number | Name | Date |
| --- | --- | --- |
| 1,842,798 | Rauen | Jan. 26, 1932 |
| 2,012,377 | Normanville | Aug. 27, 1935 |
| 2,116,234 | Cotterman | May 3, 1938 |
| 2,224,322 | Sinclair | Dec. 10, 1940 |
| 2,371,564 | Wemp | Mar. 13, 1945 |
| 2,384,448 | Banker | Sept. 11, 1945 |
| 2,410,921 | Avila | Nov. 12, 1946 |
| 2,437,517 | Greenlee | Mar. 9, 1948 |
| 2,453,156 | Neracher | Nov. 9, 1948 |
| 2,481,997 | Haigh | Sept. 13, 1949 |

FOREIGN PATENTS

| Number | Country | Date |
| --- | --- | --- |
| 219,929 | Great Britain | Mar. 6, 1924 |
| 500,605 | Great Britain | Feb. 13, 1939 |